United States Patent [19]
Okano et al.

[11] Patent Number: 5,600,458
[45] Date of Patent: Feb. 4, 1997

[54] ACTIVE MATRIX DISPLAY HAVING AT LEAST ONE NONLINEAR ELEMENT COMPOSED OF A SULFIDE FILM

[75] Inventors: Kiyoshi Okano; Satoshi Yamaue, both of Tenri, Japan

[73] Assignee: Sharp Kabushiki Kaisha, Osaka, Japan

[21] Appl. No.: 439,377

[22] Filed: May 11, 1995

[30] Foreign Application Priority Data

Jun. 1, 1994 [JP] Japan .................................. 6-120290
Aug. 15, 1994 [JP] Japan .................................. 6-191592

[51] Int. Cl.$^6$ .............................. G02F 1/136; G02F 1/135
[52] U.S. Cl. .............................. 349/44; 349/49; 349/42; 349/50
[58] Field of Search .................................. 359/58, 60, 59

[56] References Cited

U.S. PATENT DOCUMENTS

| | | | |
|---|---|---|---|
| 4,775,549 | 10/1988 | Ota et al. .................................. | 427/38 |
| 5,064,275 | 1/1991 | Tsunoda et al. .................................. | 359/58 |
| 5,164,750 | 11/1992 | Tanaka et al. .................................. | 359/58 |
| 5,220,316 | 7/1993 | Kazan .................................. | 340/784 |
| 5,274,485 | 12/1993 | Narita et al. .................................. | 359/58 |
| 5,396,354 | 3/1995 | Shimada et al. .................................. | 359/58 |

FOREIGN PATENT DOCUMENTS 61-32674  7/1986  Japan .

OTHER PUBLICATIONS

Nemirovsky et al, "Interface of p–type $Hg_{1-x}Cd_x$ Te Passivated with Native Sulfides", Journal of Applied Physics, vol. 58(1), pp. 366–373.

Suzuki et al, "A New Active Diode Matrix LCD Using Off–Stoichiometric $SiN_x$ Layer", Technical Research Report of Institute of Electronics and Communication Engineers of Japan, EID 86–16 to 25, pp. 13–16, 1986 (partial translation).

Primary Examiner—Anita Pellman Gross
Assistant Examiner—Toan Ton
Attorney, Agent, or Firm—Nixon & Vanderhye, P.C.

[57] ABSTRACT

The display apparatus of this invention includes: a display medium having an electro-optic characteristic; a pair of substrates arranged to face each other sandwiching the display medium; a pair of electrodes disposed in inner surfaces of the pair of substrates for applying a voltage to the display medium; and at least one nonlinear element including a nonlinear resistance layer composed of a sulfide film obtained by immersing a conductive or semiconductive film in a solution containing sulfur ions or ions having sulfur atoms and applying a voltage between the conductive or semiconductive film as an anode and a cathode, the nonlinear element being disposed on the inner surface of one of the pair of substrates and electrically connected to one of the pair of electrodes.

2 Claims, 8 Drawing Sheets

87: Iron 100ppm
88: Iron 1000ppm

ACTIVE MATRIX DISPLAY HAVING AT LEAST ONE NONLINEAR ELEMENT COMPOSED OF A SULFIDE FILM

BACKGROUND OF THE INVENTION

1. Field of the Invention

The present invention relates to an active matrix display apparatus provided with nonlinear resistance elements, and a method for fabricating the same.

2. Description of the Related Art

With the downsizing of office automation apparatus such as personal computers, demands for flat displays with enhanced functions have increased. In recent years, some types of flat displays have been developed, which include: displays where a voltage is applied between a pair of electrodes sandwiching a display medium having electro-optic characteristics to realize a display; and displays utilizing phenomena such as electro-luminescence, plasma emission, and electrochromic. In particular, a liquid crystal display using liquid crystal as the display medium has found a variety of applications such as watches, calculators, personal computers, and television sets, and such applications have already been put on the market.

With the recent multi-media propagation of information, the displays are increasingly required to have enhanced functions such as high resolution, high contrast, full color, and power save drive. One example of displays that satisfies the above requirements is an active matrix liquid crystal display where active elements are provided for respective pixels. As the active elements, thin film transistors (hereinafter, referred to as TFTs) and thin film diodes (hereinafter, referred to as TFDs) are now under vigorous development. TFDs have a simpler structure and the number of masks required in the fabrication process is smaller, compared with TFTs. Therefore, further cost reduction of displays using TFDs is expected in the future. As one type of TFDs, Japanese Patent Publication No. 61-32674 discloses a MIM (Metal-Insulator-Metal) element having a nonlinear resistance layer made of tantalum oxide. Liquid crystal displays including such MIM elements are now put on the market.

Hereinbelow, a liquid crystal display including conventional MIM elements made of tantalum oxide will be described with reference to FIGS. 12A and 12B. The liquid crystal display includes a MIM substrate having MIM elements as the active elements and a counter substrate. FIG. 12A is a partial plan view showing one pixel portion of the MIM substrate on which a MIM element 207 is disposed, and FIG. 12B is a sectional view taken along line 12B–12B of FIG. 12A.

As shown in FIGS. 12A and 12B, a scanning line 206 made of tantalum and a lower electrode (scanning electrode) 202 branching from the scanning line 206 are formed on a glass substrate 201. Over the lower electrode 202 is formed a nonlinear resistance layer 203 made of tantalum oxide, and an upper electrode 204 made of chrome or the like is formed on the nonlinear resistance layer 203. The lower electrode 202, the nonlinear resistance layer 203, and the upper electrode 204 constitute the MIM elements 207. Thereafter, a pixel electrode 205 composed of a transparent conductive film of ITO (Indium Tin Oxide) and the like is formed so as to overlap the upper electrode 204 for the electrical connection with the MIM element 207. The nonlinear resistance layer 203 is obtained by anodic oxidation of the lower electrode 202.

In order to obtain a high-quality liquid crystal display including the MIM elements as the switching elements, the following conditions are required: (1) The capacitance of the MIM element should be sufficiently smaller than the capacitance of liquid crystal; and (2) the current (I)—voltage (V) characteristic of the MIM element should be abrupt and the current ON/OFF ratio should be large. In the conventional MIM element made of tantalum oxide, the nonlinear resistance layer is formed by anodic oxidation as mentioned above, which is advantageous in forming a uniform film. However, this is disadvantageous in that the current ON/OFF ratio is not so large. The I–V characteristic of the MIM element made of tantalum oxide is considered to follow the Poole-Frenkel formula as shown in formula (1):

$$I = \alpha V \exp(\beta \sqrt{V})  \quad (1)$$

where $$\alpha = \frac{n\mu qs}{d} \exp\left(-\sqrt{\frac{\phi}{kT}}\right)$$

$$\beta = \frac{1}{kT} \sqrt{\frac{q^3}{\pi \epsilon \epsilon_0 d}}$$

n: carrier density

μ: mobility q: carrier charge amount s: area of element d: film thickness

φ: trap depth

ε: dielectric constant of insulating film $\epsilon_0$: dielectric constant of vacuum.

The value of β is an important parameter for determining the ON/OFF ratio. Since tantalum oxide has a high dielectric constant ε of 23 to 25, the value of β for the tantalum oxide is small compared with that for a film with a low dielectric constant. The value of β for a general MIM element made of tantalum oxide is approximately 3. When the ratio of the current obtained at the application of 20 V to the current obtained at the application of 5 V is used as the ON/OFF ratio, the value of $I_{200}/I_{SV}$ ($I_{20V}$ represents the current at the application of 20 V and $I_{SV}$ at the application of 5 V) for the MIM element made of tantalum oxide is as low as the order of $10^3$. A high ON/OFF ratio is thus not obtainable. This high dielectric constant also results in increasing the ratio of the capacitance of the nonlinear resistance element to the capacitance of the liquid crystal. This prevents the MIM element from being efficiently applied with voltage.

The object of the present invention is to provide a display apparatus including MIM elements with a large current ON/OFF ratio and a small capacitance so as to achieve high-resolution and high-contrast display.

SUMMARY OF THE INVENTION

The display apparatus of this invention includes: a display medium having an electro-optic characteristic; a pair of substrates arranged to face each other sandwiching the display medium; a pair of electrodes disposed in inner surfaces of the pair of substrates for applying a voltage to the display medium; and at least one nonlinear element including a nonlinear resistance layer composed of a sulfide film obtained by immersing a conductive or semiconductive film in a solution containing sulfur ions or ions having sulfur atoms and applying a voltage between the conductive or semiconductive film as an anode and a cathode, the nonlinear element being disposed on the inner surface of one of the pair of substrates and electrically connected to one of the pair of electrodes.

In one embodiment, the conductive film is a first substance selected from a group consisting of zinc, tantalum, and cadmium, and the nonlinear resistance layer is a sulfide of the first substance.

In another embodiment, the conductive film includes at least one second substance selected from a group consisting of aluminum, iron, nickel, chromium, copper, silver, manganese, and indium, and the nonlinear resistance layer includes the second substance as impurities.

In still another embodiment, the display medium is liquid crystal.

In another aspect of the present invention, a method for fabricating a display apparatus is provided. The method includes the steps of: forming scanning lines including branching scanning electrodes of a conductive or semiconductive film on a first substrate; immersing at least the scanning electrodes in an electrolyte containing sulfur ions or ions having sulfur atoms, and applying a voltage between the scanning electrodes as an anode and a cathode so as to sulfidize surfaces of the scanning electrodes and to form nonlinear resistance layers of a sulfide on the scanning electrodes; forming pixel electrodes electrically connected to the nonlinear resistance layers on the first substrate; and injecting a display medium having an electro-optic characteristic between the first substrate and a second substrate provided with a counter electrode.

In one embodiment, the electrolyte contains a non-aqueous solvent.

In another embodiment, the electrolyte contains polyalcohol.

In still another embodiment, the electrolyte contains at least one substance selected from a group consisting of ammonium sulfide, potassium sulfide, ammonium hydrogensulfide, and sodium sulfide.

In still another embodiment, the conductive film is a first substance selected from a group consisting of zinc, copper, tantalum, and cadmium, and the nonlinear resistance layer is a sulfide of the first substance.

In still another embodiment, the conductive film includes at least one second substance selected from a group consisting of aluminum, iron, nickel, chromium, copper, silver, manganese, and indium, and the nonlinear resistance layer includes the second substance as impurities.

In still another embodiment, the nonlinear resistance layer is formed by applying a predetermined voltage between the cathode and the scanning electrodes.

In still another embodiment, the nonlinear resistance layer is formed by applying a predetermined current between the cathode and the scanning electrodes.

Alternatively, the method for fabricating a display apparatus including a display medium having an electro-optic characteristic, a pair of substrates sandwiching the display medium, a plurality of pixel electrodes arranged in a matrix on one of the pair of substrates for applying a voltage to the display medium, and at least one nonlinear resistance element disposed in the vicinity of each of the pixel electrodes for switching the pixel electrode is provided. The method includes a step of forming a nonlinear resistance layer of each of the nonlinear resistance elements by anodically sulfidizing a conductive or semiconductive film.

Thus, according to the present invention, the nonlinear resistance layer of the nonlinear resistance element is composed of an anodic sulfidization film. This increases the ON/OFF ratio of the element, and as a result realizes high-resolution and high-contrast display. Also, the concentration of impurities in the nonlinear resistance layer can be adjusted by varying the kind and the amount of the impurities doped in the conductive thin film, and thus the I–V characteristic of the nonlinear resistance element can be easily changed. As a result, a display apparatus provided with a switching characteristic suitable for a selected electro-optic display medium can be fabricated. Further, since the nonlinear resistance layer has a low dielectric constant, the ratio of the capacitance of the nonlinear resistance element to that of the liquid crystal is small. This makes it possible to efficiently apply a voltage to the element and obtain high-precision display. By the anodic sufidization, a solid and homogeneous sulfide film having a uniform thickness with a small number of pin holes can be formed. Accordingly, the variation in the display due to a variation in the characteristics of the nonlinear elements can be reduced. The nonlinear resistance element is fabricated by the anodic sulfidization which is similar to the anodic oxidation, and the number of masks required in the photolithographic process is small compared with the case of TFTs. As a result, the fabrication cost of the display apparatus can be reduced.

Thus, the invention described herein makes possible the advantages of (1) providing a display apparatus including MIM elements with a large current ON/OFF ratio and a small capacitance so as to achieve high-resolution and high-contrast display, and (2) providing a method for fabricating such a display apparatus.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

(EXAMPLE 1)

In Example 1, a reflective display apparatus having an anodic sulfidization film of zinc as a nonlinear resistance layer, and a method for fabricating such a display apparatus will be described.

Figure 1:
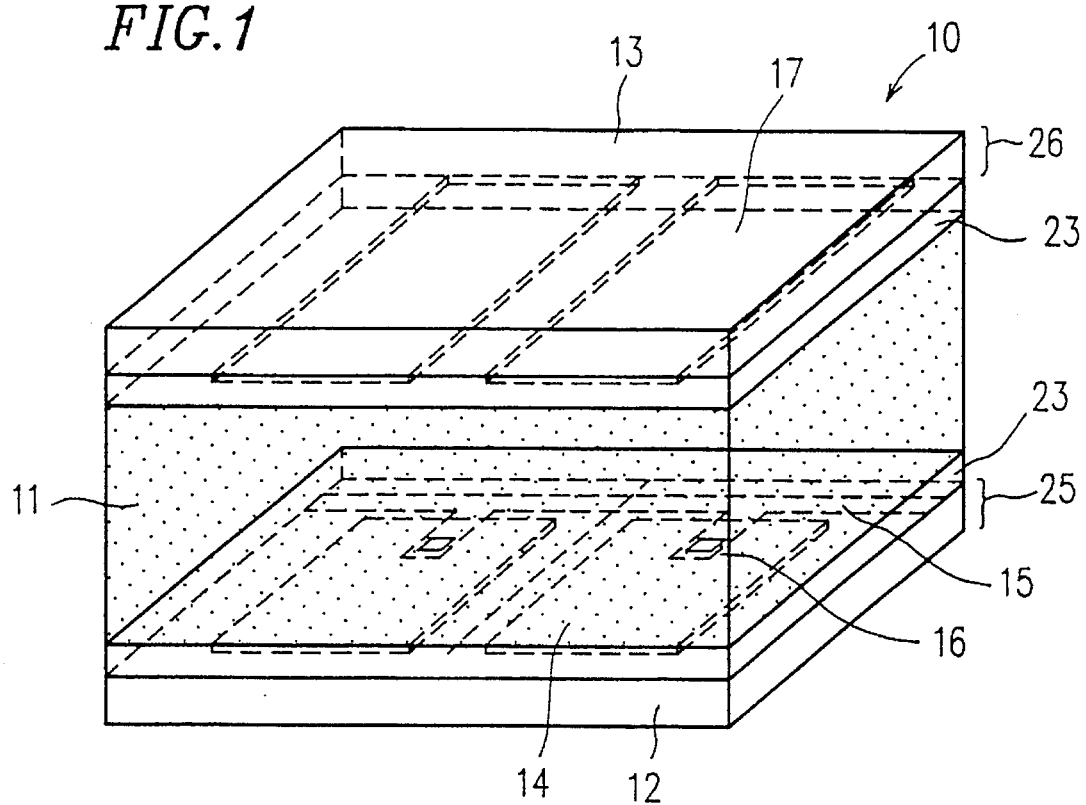
FIG. 1 is a perspective view of two pixel portions of a first example of the display apparatus according to the present invention.

FIG. 1 is a perspective view of two pixel portions of a display apparatus 10 according to the present invention provided with nonlinear elements 16. The display apparatus 10 includes a display medium 11 having electro-optic characteristics and a pair of substrates 12 and 13 disposed to face each other sandwiching the display medium 11.

Pixel electrodes 14 are formed on the surface of the substrate 12 facing the substrate 13. Two pixel electrodes 14 are shown in FIG. 1, but actually a plurality of pixel electrodes 14 are arranged in a matrix on the substrate 12 as the display apparatus 10 includes a plurality of pixels arranged in a matrix. The pixel electrodes 14 are reflective.

A scanning line 15 extends on the substrate 12 in the vicinity of the pixel electrodes 14 in a first direction. The scanning line 15 is electrically connected with the nonlinear elements 16 formed on the substrate 12, so that the pixel electrodes 14 and the scanning line 15 are electrically connected with each other by the switching of the nonlinear elements 16. Hereinbelow, the substrate 12 together with the pixel electrodes 14, the nonlinear elements 16, and the like formed thereon are collectively referred to as a MIM substrate 25.

Data electrodes 17 are formed on the surface of the substrate 13 facing the substrate 12. The data electrodes 17 extend in a direction vertical to the first direction. The pixel electrodes 14 and the data electrodes 17 are applied with a voltage so as to apply the voltage across the display medium 11. Hereinbelow, the substrate 13 together with the data electrodes 17 formed thereon are collectively referred to as a counter substrate 26. Alignment films 23 are formed on the surfaces of the MIM substrate 25 and the counter substrate 26 covering the pixel electrodes 14 and the data electrodes 17, respectively.

Figure 2A:
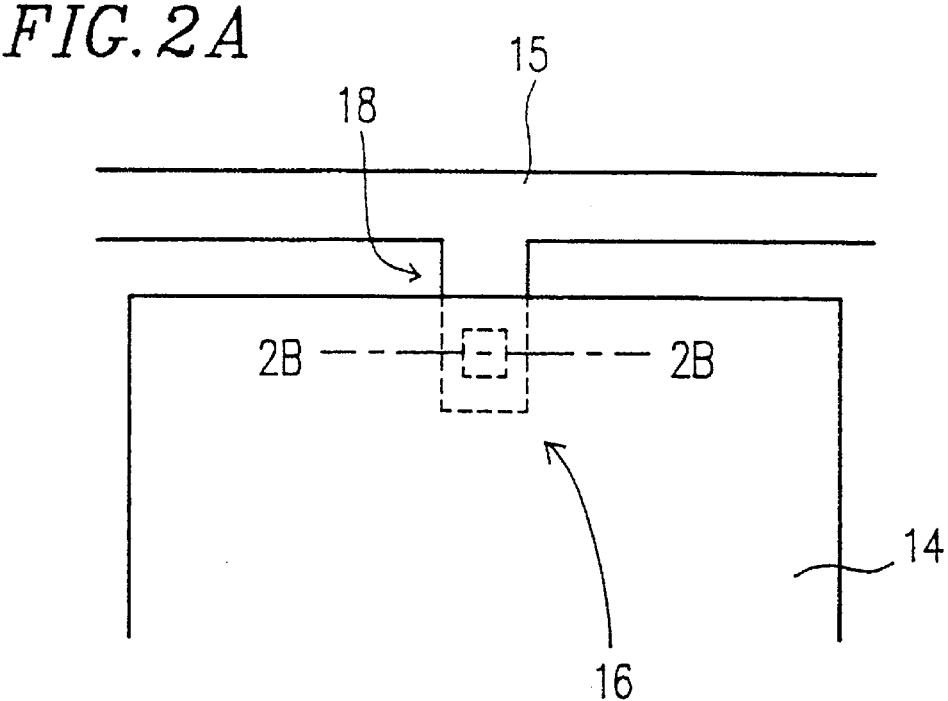
FIG. 2A is a plan view of one pixel portion of the display apparatus shown in FIG. 1.
Figure 2B:
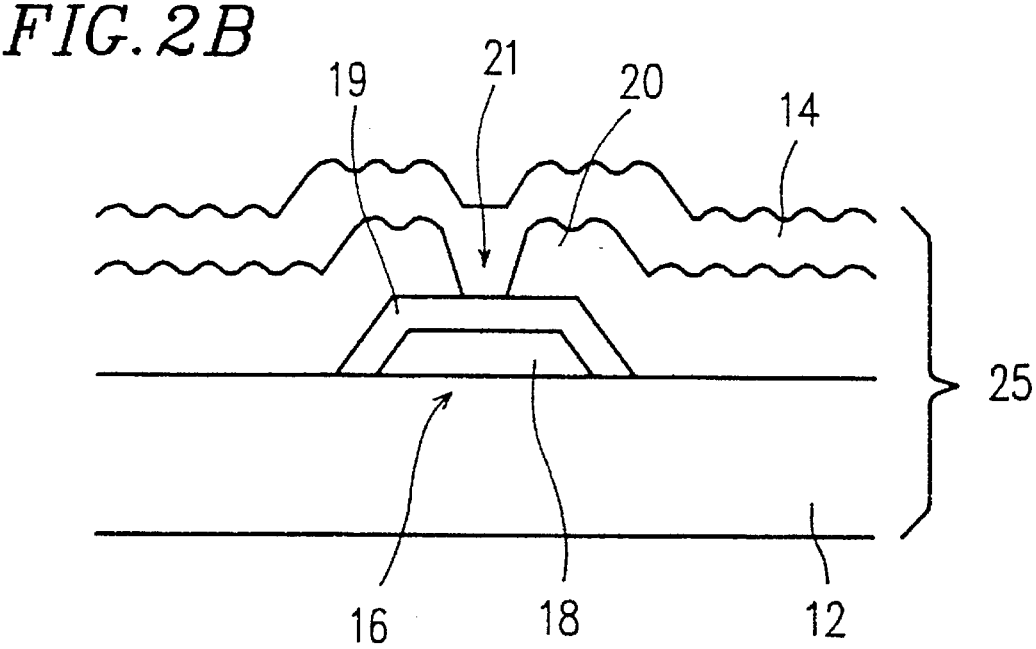
FIG. 2B is a sectional view taken along line 2B—2B of FIG. 2A.

FIG. 2A is a plan view showing one pixel portion of the MIM substrate 25, and FIG. 2B is a sectional view taken along line 2B—2B of FIG. 2A. The scanning line 15 and a scanning electrode (lower electrode) 18 branching from the scanning line 15 are formed on the substrate 12, and a nonlinear resistance layer 19 composed of an anodic sulfidization film is formed over the scanning electrode 18. An insulating film 20 with a roughened surface is formed on the substrate 12 over the nonlinear resistance layer 19, and the pixel electrode 14 is formed on the insulating film 20. The pixel electrode 14 is electrically connected with the nonlinear resistance layer 19 via a contact hole 21 formed through the insulating film 20. The scanning electrode 18, the nonlinear resistance layer 19, and the pixel electrode 14 constitute the nonlinear element 16.

Now, the process of fabricating the display apparatus with the above structure will be described. First, the fabrication of the MIM substrate 25 will be described.

A conductive thin film is formed on the substrate 12 made of an insulator such as glass. The conductive thin film is then patterned into a predetermined shape to form the scanning lines 15 and the scanning electrodes 18 branching from the scanning lines 15. More specifically, a zinc film with a thickness of about 300 nm is formed on the substrate 12 made of a glass plate (Corning 7059 borosilicate glass) by sputtering. Then, a photoresist (not shown) is applied to the zinc film, and, after an exposure and development process (photolithographic process), the zinc film is subjected to reactive ion etching (RIE; a type of dry etching) using plasma of carbon tetrafluoride/oxygen mixed gas. The photoresist is then removed from the substrate 12, thus to obtain the patterned scanning lines 15 and scanning electrodes 18.

Figure 3:
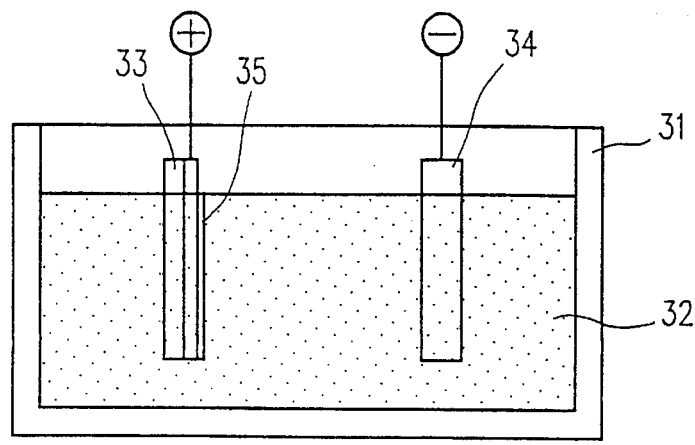
FIG. 3 is a conceptual view depicting an example of an electrolysis apparatus used for the fabrication of the display apparatus according to the present invention.

Thereafter, the anodic sulfidization films as the nonlinear resistance layers 19 are formed. The anodic sulfidization is conducted in the following manner by use of an electrolysis apparatus as shown in FIG. 3: First, an electrolysis vessel 31 is filled with electrolyte 32 containing sulfur ions or ions having V sulfur atoms. A substrate with a conductive or semiconductive film formed thereon is immersed in the electrolyte 32 to act as an anode 33. A voltage is applied between the anode 33 and a cathode 34 made of platinum or the like, so as to form a film made of a sulfide on the surface of the conductive or semiconductive film. In this anodic sulfidization, the sulfur ions in the electrolyte 32 move toward the anode 33 and react with the metal of the anode 33, forming an insoluble sulfide 35.

The reaction occurring at the anode 33 is expressed by formula (2):

$$2M + mS^{2-} \rightarrow M_2S_m + 2me^- \qquad (2)$$

where M is an mth-valent metal ion.

A sulfide film can be effectively formed when a non-aqueous electrolyte which does not include hydroxide ions such as water is used as a solvent and a solute of the electrolyte 32. This is because such a non-aqueous electrolyte does not cause anodic oxidation as expressed by formula (3) below, and thus the anodic sulfidization expressed by formula (2) is the main reaction in the electrolyte 32. In this case, water in an amount too small to cause the oxide formation reaction may be contained in the electrolyte 32.

$$2M + mO^{2-} \rightarrow M_2O_m + 2me^- \qquad (3)$$

Polyalcohol such as ethylene glycol and propylene glycol, ethanol, methanol, etc. may be used as the solvent of the non-aqueous electrolyte, while sulfides soluble in the above solvents, such as ammonium sulfide, potassium sulfide, ammonium hydrogensulfide, and sodium sulfide, or the combination thereof may be used as a solute.

In the anodic sulfidization, as in the anodic oxidation, the thickness of the formed sulfide film is proportional to the variation in the formation voltage. This makes it possible to adopt two types of formation methods; a constant-voltage formation method where a constant voltage is applied between the anode and the cathode to control the film thickness by the value of the voltage, and a constant-current formation method where an applied voltage is raised so as to have a constant density of current flowing between the anode and the cathode, and the thickness is controlled by the formation time or the finally reached voltage. The constant-voltage formation method is advantageous in that the thickness can be easily controlled by the applied voltage, while the constant-current formation method is advantageous in that a sulfide film homogeneous in the vertical direction can be formed.

A technique for forming such an anodic sulfidization film is reported in the "Journal of Applied Physics", 58(1), 1985, p. 366. This report relates to using an anodic sulfidization film as part of a gate insulating film of a MIS-FET (Metal-Insulator-Semiconductor Field Effect Transistor), and is not related to applying it to a driving device for a display apparatus.

Referring back to FIG. 2A, the nonlinear resistance layer 19 is formed by the above-described anodic sulfidization. Before the anodic sulfidization, the surfaces of the scanning lines 15 excluding the scanning electrodes 18 and terminals for the connection with drivers should be covered with plastic and the like so as to protect these surfaces from the formation of sulfide films.

More specifically, the substrate 12 is immersed in an ethylene glycol solution containing about 0.1 mol/l of sodium sulfide and the like. The scanning electrodes 18 on the substrate 12 are used as the anode and a voltage is applied between the anode and a cathode made of platinum so as to form a layer of zinc sulfide on each of the zinc surfaces exposed on the substrate 12. The constant-voltage formation is adopted as the method of applying a voltage between the anode and the cathode. An appropriately set voltage is applied for about three hours to form the nonlinear resistance layer 19 made of zinc sulfide having a thickness of about 100 nm. The thickness of the sulfide film as the nonlinear resistance layer 19 is preferably in the range of 20 nm to 200 nm. The thickness of less than 20 nm increases a leak between the pixel electrode 14 and the data electrode 17, while the thickness of more than 200 nm increases a driving voltage.

Then, the insulating film 20 is formed over the entire surface of the substrate 12 with the above-described structure or on the scanning lines 15, the scanning electrodes 18, and the adjacent regions. The contact holes 21 are then formed through the insulating film 20 for the connection between the nonlinear resistance layers 19 and the pixel electrodes 14 which will be described later in detail. More specifically, an organic photosensitive resin was applied to the entire surface of the substrate 12 to a thickness of about 400 nm by a spin coat method. After the exposure and development process, the insulating film 20 with the contact holes 21 formed therethrough is obtained. The surface of the insulating film 20 is then roughened by exposing the film in the plasma of carbon tetrafluoride/oxygen mixed gas in a manner similar to the RIE. This roughening of the insulating film 20 provides a rough surface on the pixel electrodes 14 to be formed on the insulating film 20, and the resultant reflective liquid crystal display apparatus obtains a scattering effect.

A conductive thin film made of a reflective material is formed and patterned to form the pixel electrodes 14. More specifically, aluminum is deposited to a thickness of about 200 nm by sputtering, and, after the photolithographic process, wet-etched by use of phosphoric acid or a mixed acid of phosphoric acid, nitric acid, and acetic acid. Then, a photoresist is removed so as to obtain the pixel electrodes 14 electrically connected with the upper portions of the nonlinear resistance layers 19 via the respective contact holes 21.

Thus, the nonlinear elements 16 each composed of the scanning electrode 18, the nonlinear resistance layer 19, and a portion of the pixel electrode 14 are formed, with the anodic sulfidization film of zinc being formed as the nonlinear resistance layer 19.

The fabrication of the counter substrate 26 will now be described.

As shown in FIG. 1, ITO is deposited on the substrate 13 made of a glass plate (Corning 7059 borosilicate glass) to a thickness of about 200 nm by sputtering. After the photolithographic process, the ITO film is etched by use of hydrobromic acid. Then, a photoresist is removed so as to obtain the stripe-shaped data electrodes 17.

Thereafter, the alignment films 23 are formed on the respective surfaces of the thus-fabricated MIM substrate 25 and counter substrate 26 on which the electrodes are formed. Then, the substrates 25 and 26 are seal-printed and attached together so that the surfaces thereof on which the alignment films 23 are formed face each other, with a space therebetween. The display medium 11 composed of liquid crystal is injected in the space and then the injection port is sealed. Thus, the reflective liquid crystal display apparatus 10 is completed. In this example, vertical alignment films are used as the alignment films 23, and nematic-cholesteric phase transition type guest-host liquid crystal is used as the display medium 11.

The thus-obtained liquid crystal display apparatus of this example has the nonlinear elements including the anodic sulfidization film of zinc having a high ON/OFF ratio. Accordingly, it is easy to drive the liquid crystal of the nematic-cholesteric phase transition type guest-host mode (also referred to as a White-Tailored mode). This makes it possible to obtain a paper-white display with high contrast. Also, since the dielectric constant of the anodic sulfidization film is low, a voltage can be effectively applied to the nonlinear elements, realizing display with high precision. Since the anodic sulfidization film is solid and uniform in the thickness with a small number of pin holes, the variation in the display due to a variation in the characteristics of the nonlinear elements can be reduced. A sulfide film formed by a method other than the anodic sulfidization has a crystal structure including column-shaped crystals extending in a direction vertical to the thickness direction of the sulfide film. This causes a leak current to generate in the thickness direction of the sulfide film. On the other hand, the anodic sulfidization film has an amorphous structure with a very fine particle diameter, and thus exhibits excellent insulation property. Since the thickness of the nonlinear resistance layer 19 is set in the range of 20 nm to 200 nm as described above, a leak between the upper and lower electrodes can be prevented, and the driving voltage for the drivers can be reduced.

Since each pixel electrode 14 acts as a reflector, it is not required to place a reflector outside the substrate 12. This reduces the cost and provides brighter display.

The nonlinear elements 16 require only about three masks in the photolithographic process and can be fabricated by a process similar to the conventional anodic oxidation. This reduces the fabrication cost of the display apparatus.

In Example 1, zinc was used as the material for the scanning lines 15 and the scanning electrodes 18. Other conductors which can be anodically sulfidized, such as copper, cadmium, and tantalum can also be used. A portion of each of the scanning lines 15 may be used as the scanning electrode, instead of the branching scanning electrode (lower electrode) 18, and the nonlinear resistance layer may be formed on this portion of the scanning line.

The insulating film 20 may be omitted, although with the insulating film 20, current leak at bends of the nonlinear resistance layer 19 and insulation breakdown of the nonlinear elements can be prevented. Materials other than the organic photosensitive resin may be used for the insulating film 20. An inorganic film of silicon nitride, silicon oxide, or the like may be formed, for example. The use of a photosensitive resin is advantageous in that it simplifies the patterning process. The surface of the insulating film 20 may not be roughened, though the roughened surface allows the pixel electrodes 14 of the resultant reflective liquid crystal display apparatus to act as a scattering plate, achieving brighter display.

Twisted or homogeneous nematic liquid crystal may be used as the display medium 11, instead of the nematic-cholesteric phase transition type guest-host liquid crystal. In this alternative case, polarizers are preferably disposed on the outer surfaces of the substrates 12 and 13.

(EXAMPLE 2)

In Example 2, a transparent display apparatus where two nonlinear elements each including an anodic sulfidization film of zinc are connected in series in reverse polarities in one pixel will be described.

Figure 4A:
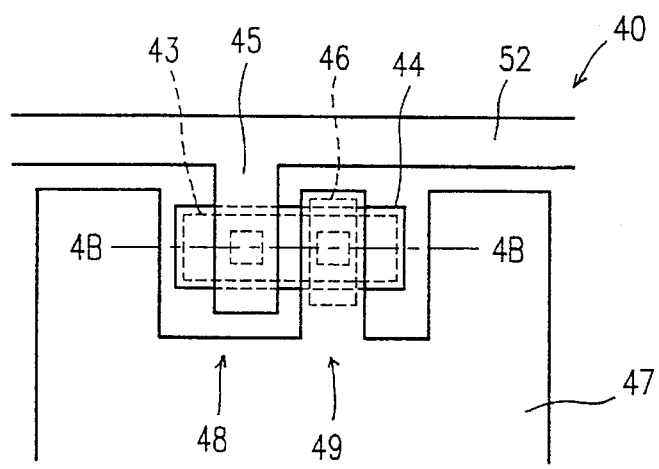
FIG. 4A is a plan view of one pixel portion of a second example of the display apparatus according to the present invention.
Figure 4B:
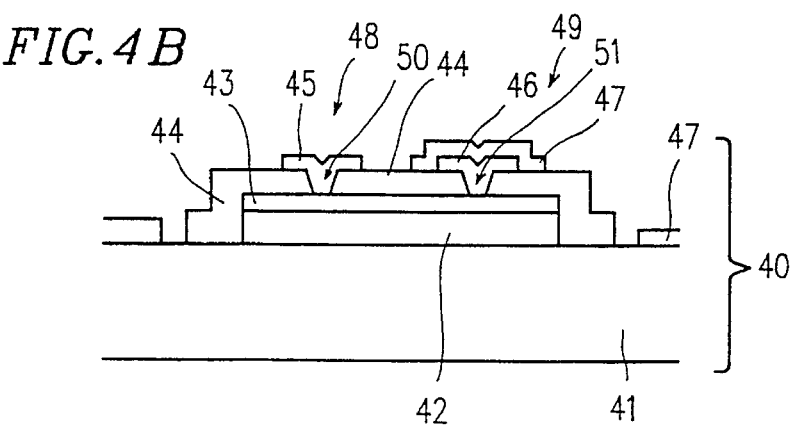
FIG. 4B is a sectional view taken along line 4B—4B of FIG. 4A.

FIG. 4A is a plan view showing one pixel portion of a MIM substrate 40 of the transparent display apparatus having nonlinear elements 48 and 49 of this example. The MIM substrate 40 includes each one of the nonlinear elements 48 and 49. FIG. 4B is a sectional view taken along line 4B—4B of FIG. 4A. The transparent display apparatus of Example 2 has the same structure as the display apparatus 10 shown in FIG. 1, except that the former has the MIM substrate 40 shown in FIGS. 4A and 4B instead of the MIM substrate 25 shown in FIG. 1.

Referring to FIGS. 4A and 4B, an electrode 42 is formed as an island on a substrate 41 made of glass, and a nonlinear resistance layer 43 composed of an anodic sulfidization film is formed over the electrode 42. An island-shaped insulating film 44 is formed over the electrode 42 and the nonlinear resistance layer 43. On the insulating film 44 are formed a scanning electrode 45 branching from a scanning line 52 and an upper electrode 46, both of which are electrically connected with the nonlinear resistance layer 43 via contact holes 50 and 51, respectively.

A pixel electrode 47 composed of a transparent conductive film is formed on the substrate 41. A portion of the pixel electrode 47 covers the upper electrode 46, so as to be electrically connected with the nonlinear resistance layer 43 via the upper electrode 46. The scanning electrode 45, the nonlinear resistance layer 43, and the electrode 42 constitute the nonlinear element 48. The upper electrode 46, the nonlinear resistance layer 43, and the electrode 42 constitute the nonlinear element 49. The nonlinear elements 48 and 49 are electrically connected with each other via the electrode 42 in reverse polarities.

Now, the process of fabricating the MIM substrate 40 of the display apparatus of Example 2 will be described.

A conductive thin film is formed on the substrate 41 made of an insulator such as glass. The conductive thin film is then patterned into a predetermined shape to form stripe-shaped electrodes (not shown). More specifically, a zinc film with a thickness of about 300 nm is formed on the substrate 41 made of glass by sputtering. The zinc film is then subjected to photolithography and etching, so as to obtain the stripe-shaped electrodes.

Thereafter, an anodic sulfidization film (not shown) is formed by anodically sulfidizing each surface of the electrodes. More specifically, the substrate 41 is immersed in an ethylene glycol solution containing about 0.1 mol/l of sodium sulfide and the like. The substrate 41 is used as the anode and a voltage is applied between the anode and a cathode made of platinum so as to form a layer of zinc sulfide on each zinc surface exposed on the substrate 41. The constant-current formation method was used for applying a voltage between the anode and the cathode. The anodic sulfidization film made of zinc sulfide having a thickness of about 70 nm was formed by applying a voltage at a constant current density of about 1 A/m$^2$ for an appropriate formation time.

The stripe-shaped electrodes with the anodic sulfidization films formed thereon are then patterned into islands of electrodes. The island-shaped electrodes 42 and the nonlinear resistance layers 43 composed of the anodic sulfidization films formed thereon are thus obtained by photolithography and etching.

Thereafter, the insulating film 44 having an island shape is formed over each of the electrodes 42 and the nonlinear resistance layers 43, and the contact holes 50 and 51 for connecting the nonlinear resistance layer 43 with the scanning electrode 45 and the upper electrode 46 to be described later in detail, respectively, are formed through the insulating film 44 for each pixel. More specifically, a photosensitive resin having a thickness of about 300 nm is applied to the surface of the substrate 41 by the spin coat method. After the exposure and development process, the insulating film 44 with the contact holes 50 and 51 formed therethrough is obtained.

Then, the scanning lines 52, the scanning electrodes 45 branching from the scanning lines 52, and the upper electrodes 46 for connecting the nonlinear resistance layers 43 with the pixel electrodes 47 are formed. More specifically, a titanium film having a thickness of about 200 nm was formed by sputtering. After the photolithographic process, the film was wet-etched by use of an ethylene diamine tetraacetic acid solution, and a photoresist was removed. Thus, the scanning lines 52, the scanning electrodes 45, and the upper electrodes 46 were formed. By this formation, the scanning electrodes 45 and the upper electrodes 46 are electrically connected with the nonlinear resistance layers 43 via the contact holes 50 and 51, respectively.

Finally, the pixel electrodes 47 each composed of a transparent conductive film is formed. In this example, ITO is deposited to a thickness of about 200 nm by sputtering. After the photolithographic process, the resultant film is wet-etched by use of hydrobromic acid. Then, a photoresist is removed so as to obtain the pixel electrodes 47 connected with the upper portion of the nonlinear resistance layers 43 via the upper electrodes 46.

Thus, there is fabricated the MIM substrate 40 having, for each pixel, the nonlinear element 48 composed of the electrode 42, the nonlinear resistance layer 43, and the scanning electrode 45 and the nonlinear element 49 composed of the electrode 42, the nonlinear resistance layer 43, and the upper electrode 46 which are connected with each other in series in reverse polarities (in a back-to-back structure).

The fabrication of a counter substrate having data electrodes and the injection of a display medium into a space between the substrates are conducted in the manner as described in Example 1.

According to the display apparatus of Example 2, the two nonlinear elements 48 and 49 are connected with each other in the back-to-back structure between the scanning electrode 45 and the pixel electrode 47. This improves the asymmetrical current-voltage characteristic of the element. Also, the upper electrode 46 made of a material different from that of the pixel electrode 47 is formed between the nonlinear resistance layer 43 and the pixel electrode 47. This makes it possible to select the material for the pixel electrode 47 at discretion, which is advantageous in the case of the transparent display apparatus. Further, since the upper electrode 46 is formed of the same material as the scanning electrode 45, the asymmetricity of the nonlinear elements can be improved.

In Example 2, two two-terminal nonlinear elements were connected with each other in the back-to-back structure. It is also possible to connect two nonlinear elements in parallel in reverse polarities, i.e., in a ring structure.

(EXAMPLE 3)

In Example 3, a reflective display apparatus where eight nonlinear elements each including an anodic sulfidization film of zinc are connected in series in the same polarity in each pixel will be described.

Figure 5A:
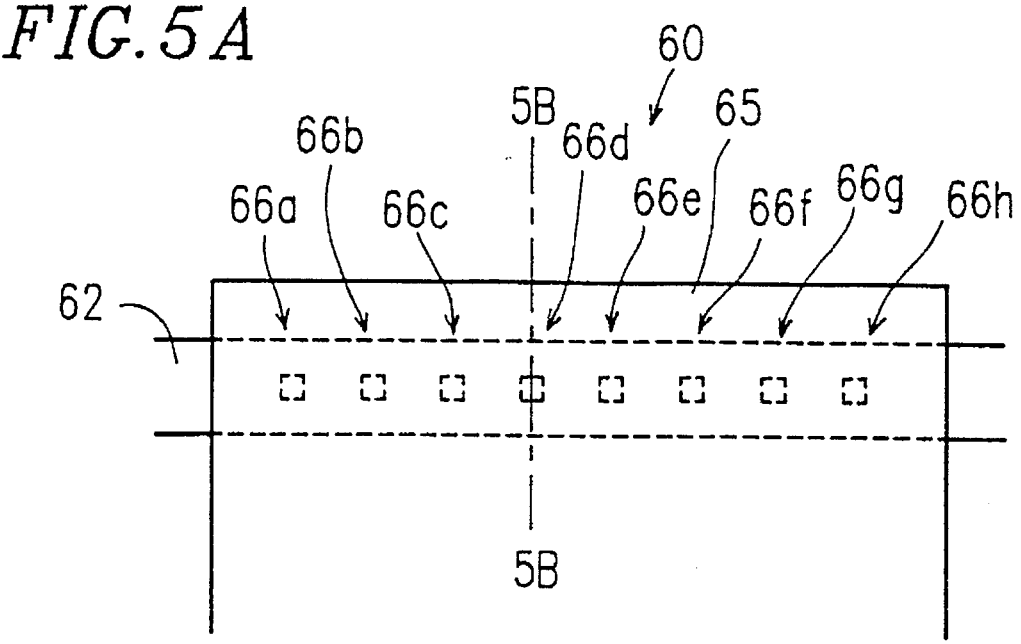
FIG. 5A is a plan view of one pixel portion of a third example of the display apparatus according to the present invention.
Figure 5B:
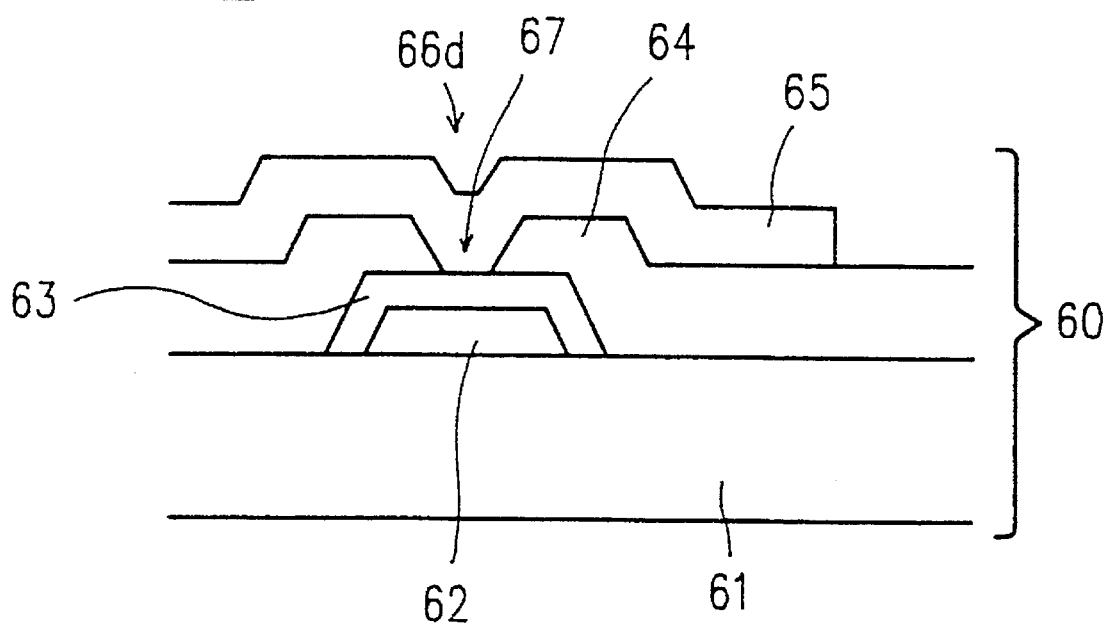
FIG. 5B is a sectional view taken along line 5B—5B of FIG. 5A.

FIG. 5A is a plan view showing one pixel portion of a MIM substrate 60 of the reflective display apparatus having nonlinear elements 66a to 66h of this example. The MIM substrate 60 includes each one of the nonlinear elements 66a to 66h. FIG. 5B is a sectional view taken along line 5B—5B of FIG. 5A. The reflective display apparatus of Example 3 has the same structure as the display apparatus 10 shown in FIG. 1, except that the former has the MIM substrate 60 shown in FIGS. 5A and 5B instead of the MIM substrate 25 shown in FIG. 1.

Referring to FIGS. 5A and 5B, a scanning line 62 is formed on a substrate 61 made of glass, and a nonlinear resistance layer 63 composed of an anodic sulfidization film is formed on the scanning line 62. A portion of the scanning line 62 acts as a scanning electrode. An insulating film 64 is formed on the substrate 61 covering the nonlinear resistance layer 63, and a pixel electrode 65 having a reflective property is formed on the insulating film 64. The pixel electrode 65 is electrically connected with the nonlinear resistance layer 63 via a contact hole 67 formed through the insulating film 64. The scanning line 62 as the scanning electrode, the nonlinear resistance layer 63, and the pixel electrode 65 constitute each of the nonlinear elements 66a to 66h.

Now, the process of fabricating the MIM substrate 60 of the display apparatus of Example 3 will be described.

A conductive thin film is formed on the substrate 61 made of an insulator such as glass. The conductive thin film is then patterned into a predetermined shape to form the scanning lines 62. In this example, a zinc film with a thickness of about 300 nm is formed on the substrate 61 made of glass by sputtering. The zinc film is then subjected to the photolithographic process and the RIE process, and after the removal of a photoresist, the patterned scanning lines 62 are obtained.

Thereafter, an anodic sulfidization films as the nonlinear resistance layers 63 are formed. Before the anodic sulfidization, the surfaces of the scanning lines 62 and terminals for the connection with drivers should be covered with plastic and the like so as to protect these surfaces from the anodic sulfidization. More specifically, the substrate 61 is immersed in an ethylene glycol solution containing about 0.1 mol/l of ammonium sulfide and the like. The scanning lines 62 on the substrate 61 are used as the anode and a voltage is applied between the anode and a cathode made of platinum so as to form layers of zinc sulfide which is to be the nonlinear resistance layers 63 on the zinc surfaces exposed on the substrate 61. The constant-current formation is adopted as the method of applying a voltage between the anode and the cathode. The nonlinear resistance layers 63 made of zinc sulfide having a thickness of about 150 nm are formed by applying a voltage at a constant current density of about 1.5 $A/m^2$.

Subsequently, the insulating film 64 is formed on the substrate 61 covering the nonlinear resistance layers 63, and the contact holes 67 for connecting the nonlinear resistance layers 63 and the pixel electrodes 65 which will be described later in detail are formed through the insulating film 64. More specifically, a photosensitive resin is applied to the surface of the substrate 61 to a thickness of about 300 nm by the spin coat method. After the exposure and development process, the insulating film 64 with eight contact holes 67 for each pixel formed therethrough is obtained.

Then, a conductive thin film composed of a reflective material is formed on the insulating film 64 and patterned to obtain the pixel electrodes 65. In this example, aluminum is deposited to a thickness of about 200 nm by sputtering, and wet-etched by use of phosphoric acid or a mixed acid of phosphoric acid, nitric acid, and acetic acid. Then, a photoresist is removed so as to obtain the pixel electrodes 65 which are electrically connected with the upper portions of the nonlinear resistance layers 63 via the respective contact holes 67.

Thus, the nonlinear elements 66a to 66h each composed of the scanning line (scanning electrode) 62, the nonlinear resistance layer 63, and the pixel electrode 65 are formed, and the MIM substrate 60 of the reflective liquid crystal display apparatus where these eight nonlinear elements 66a to 66h are connected in parallel in the same polarity is fabricated.

The fabrication of a counter substrate and the subsequent processes for the completion of the display apparatus are conducted in the manner as described in Example 1.

Thus, the display apparatus of Example 3 include a plurality of nonlinear elements 66a to 66h connected in parallel in the same polarity for each pixel between the scanning electrode 62 and the pixel electrode 65. This provides a redundant structure and improves the reliability of the display apparatus. The display apparatus of Example 3 is also advantageous in that, since the scanning electrodes 62 extend underneath the pixel electrodes 65, the numerical aperture can be improved.

(EXAMPLE 4)

In Example 4, a reflective display apparatus where a film obtained by the anodic sulfidization of zinc doped with iron as impurities is used as a nonlinear resistance layer.

Figure 6:
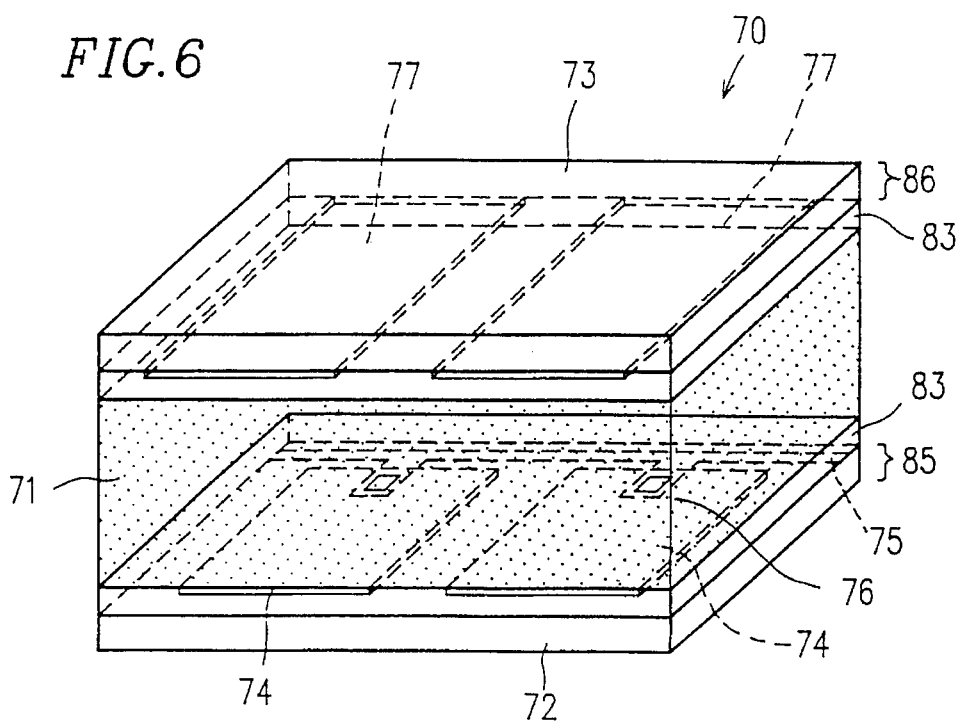
FIG. 6 is a perspective view of two pixel portions of a fourth example of the display apparatus according to the present invention.

FIG. 6 is a perspective view of two pixel portions of a display apparatus 70 of Example 4 provided with nonlinear elements 76. The display apparatus 70 includes a display medium 71 having electro-optic characteristics and a pair of substrates 72 and 73 disposed to face each other sandwiching the display medium 71.

Pixel electrodes 74 are formed on the surface of the substrate 72 facing the substrate 73. Two pixel electrodes 74 are shown in FIG. 6, but actually a plurality of pixel electrodes 74 are arranged in a matrix on the substrate 72 as the display apparatus 70 includes a plurality of pixels arranged in a matrix. The pixel electrodes 74 are reflective.

A scanning line 75 extends on the substrate 72 in the vicinity of the pixel electrodes 74 in a first direction. The scanning line 75 is electrically connected with the nonlinear elements 76 formed on the substrate 72, so that the pixel electrodes 74 and the scanning line 75 are electrically connected with each other by the switching of the nonlinear elements 76. Hereinbelow, the substrate 72 together with the pixel electrodes 74, the nonlinear elements 76, and the like formed thereon are collectively referred to as a MIM substrate 85.

Data electrodes 77 are formed on the surface of the substrate 73 facing the substrate 72. The data electrodes 77 extend in a direction vertical to the first direction. The pixel electrodes 74 and the data electrodes 77 are applied with a voltage so as to apply the voltage across the display medium 71. Hereinbelow, the substrate 73 together with the data electrodes 77 formed thereon are collectively referred to as a counter substrate 86. Alignment films 83 are formed on the surfaces of the MIM substrate 85 and the counter substrate 86 covering the pixel electrodes 74 and the data electrodes 77, respectively.

Figure 7A:
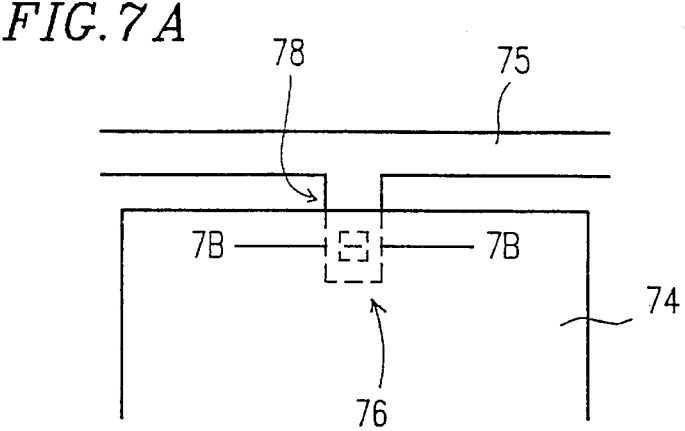
FIG. 7A is a plan view of one pixel portion of the display apparatus shown in FIG. 6.
Figure 7B:
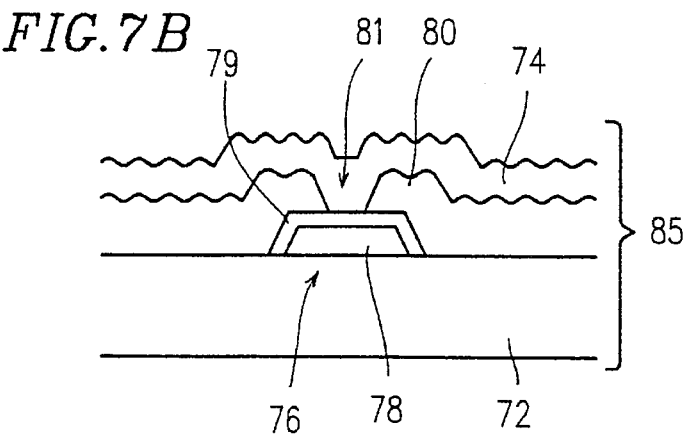
FIG. 7B is a sectional view taken along line 7B—7B of FIG. 7A.

FIG. 7A is a plan view showing one pixel portion of the MIM substrate 85, and FIG. 7B is a sectional view taken along line 7B—7B of FIG. 7A. The scanning line 75 and a scanning electrode (lower electrode) 78 branching from the scanning line 75 are formed on the substrate 72, and a nonlinear resistance layer 79 composed of an anodic sulfidization film is formed over the scanning electrode 78. An insulating film 80 with a roughened surface is formed on the substrate 72 over the nonlinear resistance layer 79, and the pixel electrode 74 is formed on the insulating film 80. The pixel electrode 74 is electrically connected with the nonlinear resistance layer 79 via a contact hole 81 formed through the insulating film 80. The scanning electrode 78, the nonlinear resistance layer 79, and a portion of the pixel electrode 74 constitute the nonlinear element 76.

Now, the process of fabricating the display apparatus with the above structure will be described. First, the fabrication of the MIM substrate 85 will be described.

A conductive thin film doped with impurities is formed on the substrate 72 made of an insulator such as glass. The conductive thin film is then patterned into a predetermined shape to form the scanning lines 75 and the scanning electrodes 78 branching from the scanning lines 75. More specifically, a zinc target with iron chips placed thereon is used for the sputtering in an atmosphere of argon gas, so as to form a zinc film doped with about 500 ppm of iron to a thickness of about 300 nm on the substrate 72 made of a glass plate (Corning 7059 borosilicate glass). Then, a photoresist (not shown) is applied to the zinc film, and, after the exposure and development process (photolithographic process), the zinc film is subjected to reactive ion etching (RIE) using plasma of carbon tetrafluoride/oxygen mixed gas. The photoresist is then removed from the substrate thus to obtain the patterned scanning lines 75 and scanning electrodes 78.

Thereafter, the nonlinear resistance layers 79 is formed by use of an electrolytic apparatus as shown in FIG. 3. Before this anodic sulfidization, the surfaces of the scanning lines 75 excluding the scanning electrodes 78 and terminals for the connection with drivers should be covered with plastic and the like so as to protect these surfaces from the formation of sulfide films.

More specifically, the substrate 72 is immersed in an ethylene glycol solution containing about 0.1 mol/l of sodium sulfide and the like. The scanning electrodes 78 are used as the anode and a voltage is applied between the anode and a cathode made of platinum so as to form a layer of zinc sulfide on each of the surfaces of zinc doped with iron impurities exposed on the substrate 72. The constant-voltage formation is adopted as the method of applying a voltage between the anode and the cathode. An appropriately set voltage is applied for about three hours to form the nonlinear resistance layers 79 made of zinc sulfide having a thickness of about 100 nm.

Then, the insulating film 80 is formed over the entire surface of the substrate 72 with the above-described structure or on the scanning lines 75, the scanning electrodes 78, and the adjacent regions, and the contact holes 81 are formed through the insulating film 80 for the connection between the nonlinear resistance layers 79 and the pixel electrodes 74 which will be described later in detail. More specifically, an organic photosensitive resin is applied to the entire surface of the substrate 72 to a thickness of about 400 nm by the spin coat method. After the exposure and development process, the insulating film 80 with the contact holes 81 formed therethrough is obtained. The surface of the resultant insulating film 80 is then roughened by exposing the film in the plasma of carbon tetrafluoride/oxygen mixed gas in a manner similar to the RIE. This roughening of the insulating film 80 provides a rough surface on the pixel electrodes 74 to be formed on the insulating film 80, and the resultant reflective liquid crystal display apparatus obtains a scattering effect.

A conductive thin film made of a reflective material is formed and patterned to form the pixel electrodes 74. More specifically, aluminum is deposited to a thickness of about 200 nm by sputtering, and, after the photolithographic process, wet-etched by use of phosphoric acid or a mixed acid of phosphoric acid, nitric acid, and acetic acid. Then, the photoresist is removed so as to obtain the pixel electrodes 74 which are electrically connected with the upper portions of the nonlinear resistance layers 79 via the respective contact holes 81.

Thus, the nonlinear elements 76 each composed of the scanning electrode 78, the nonlinear resistance layer 79, and a portion of the pixel electrode 74 are formed, with the anodic sulfidization film of zinc being established as the nonlinear resistance layer 79.

The fabrication of the counter substrate 86 will now be described.

ITO is deposited on the substrate 73 made of a glass plate (Corning 7059 borosilicate glass) to a thickness of about 200 nm by sputtering. After the photolithographic process, the ITO film is etched by use of hydrobromic acid. Then, a photoresist is removed so as to obtain the stripe-shaped data electrodes 77.

Thereafter, the alignment films 83 are formed on the surfaces of the thus-fabricated MIM substrate 85 and counter substrate 86 on which the electrodes are formed. Then, the substrates 85 and 86 are seal-printed and attached together so that the surfaces thereof on which the alignment films 83 are formed face each other, with a space therebetween. The display medium 71 composed of liquid crystal is injected in the space and then the injection port is sealed. Thus, the reflective liquid crystal display apparatus 70 is completed. In this example, vertical alignment films are used as the alignment films 83, and nematic-cholesteric phase transition type guest-host liquid crystal is used as the display medium 71.

Figure 8:
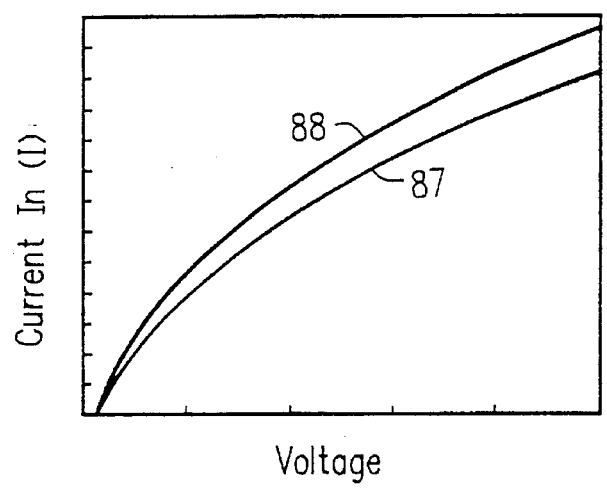
FIG. 8 is a graph showing the I–V characteristic of a nonlinear element used for the fourth example of the display apparatus according to the present invention.

FIG. 8 shows the current-voltage (I–V) characteristic of the nonlinear elements of the display apparatus fabricated by the method described above. In FIG. 8, a curve 87 represents the characteristic of a nonlinear element including a nonlinear resistance layer obtained by anodically sulfidizing a scanning electrode made of zinc containing 100 ppm of iron. A curve 88 represents the characteristic of a nonlinear element including a nonlinear resistance layer obtained by anodically sulfidizing a scanning electrode made of zinc containing 1000 ppm of iron. As is observed from FIG. 8, the I–V characteristic of the nonlinear element can be varied by varying the doped amount of impurities. This makes it possible to design a nonlinear element having an optimal characteristic in accordance with the characteristic of the display medium. In particular, in this example, not only the material for the conductive film to be anodically sulfidized and the material for the impurities can be selected from a variety of types, but also the concentration of the impurities can be adjusted. Accordingly, it is possible to precisely adjust the I–V characteristic of the nonlinear element.

Zinc, copper, tantalum, and cadmium may be used as the material for the conductive film to be anodically sulfidized. Aluminum, iron, nickel, chromium, copper, silver, manganese, and indium may be used as the impurities. A combination of two or more of the above metals may also be used as the impurities. The conductive film doped with impurities may be formed by a thin film formation method such as sputtering, vapor evaporation, and chemical vapor deposition (CVD).

The thus-obtained liquid crystal display apparatus of this example has the nonlinear elements including the anodic sulfidization film of zinc doped with impurities having a high ON/OFF ratio. Accordingly, it is easy to drive the liquid crystal of the nematic-cholesteric phase transition type guest-host mode (also referred to as a white tailored mode). This makes it possible to obtain paper-white display with high contrast. Also, since the dielectric constant of the anodic sulfidization film is low, a voltage can be effectively applied to the nonlinear elements, realizing display with high precision. Since the anodic sulfidization film is solid and uniform in the thickness with a small number of pin holes, the variation in the display due to a variation in the characteristics of the nonlinear elements can be reduced. A sulfide film formed by a method other than the anodic sulfidization has a crystal structure including column-shaped crystals extending in a direction vertical to the thickness direction of the sulfide film. This causes a leak current to generate in the thickness direction of the sulfide film. On the other hand, the anodic sulfidization film has an amorphous structure with a very fine particle diameter, and thus exhibits excellent insulation property. Since the thickness of the nonlinear resistance layer is set in the range of 20 nm to 200 nm as described above, a leak between the upper and lower electrodes can be prevented, and the driving voltage for the drivers can be reduced.

Since each pixel electrode acts as a reflector, it is not required to place a reflector outside the substrate 72. This reduces the cost and provides brighter display.

The nonlinear elements require only about three masks in the photolithographic process and can be fabricated by a process similar to the conventional anodic oxidation. This reduces the fabrication cost of the display apparatus.

In Example 4, a portion of each of the scanning lines may be used as the scanning electrode, instead of the branching scanning electrode (lower electrode) 78, and the nonlinear resistance layer may be formed on this portion of the scanning line.

The insulating film 80 may be omitted, though, with the insulating film 80, current leak at bends of the nonlinear resistance layers 79 and insulation breakdown of the nonlinear elements can be prevented. Materials other than the organic photosensitive resin may be used for the insulating film 80. An inorganic film of silicon nitride, silicon oxide, or the like may be formed, for example. The use of a photosensitive resin is advantageous in that it simplifies the patterning process. The surface of the insulating film 80 may not be roughened, though the roughened surface allows the pixel electrodes 74 of the resultant reflective liquid crystal display apparatus to act as a scattering plate, achieving brighter display.

Twisted or homogeneous nematic liquid crystal may be used as the display medium 71, instead of the nematic-cholesteric phase transition type guest-host liquid crystal. In this alternative case, polarizers are preferably disposed on the outer surfaces of the substrates 72 and 73.

(EXAMPLE 5)

In Example 5, a transparent display apparatus where two nonlinear elements each including an anodic sulfidization film of zinc doped with nickel as impurities are connected in series in reverse polarities for each pixel will be described.

Figure 9A:
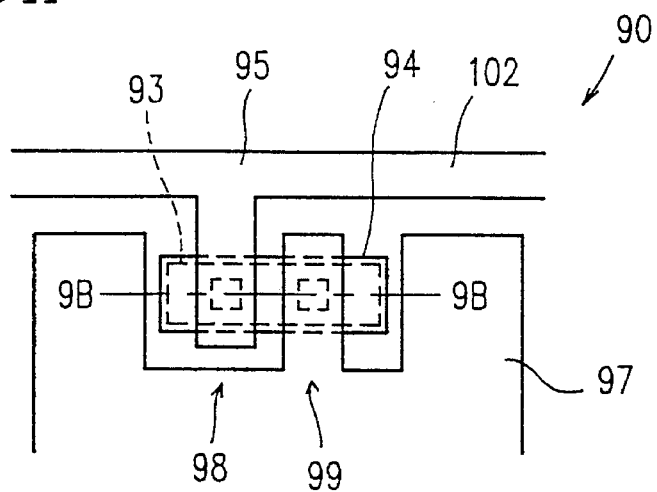
FIG. 9A is a plan view of one pixel portion of a fifth example of the display apparatus according to the present invention.
Figure 9B:
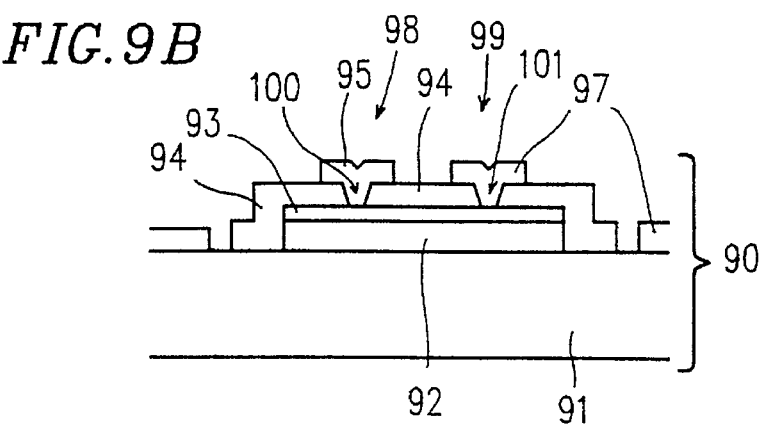
FIG. 9B is a sectional view taken along line 9B—9B of FIG. 9A.

FIG. 9A is a plan view showing one pixel portion of a MIM substrate 90 of the transparent display apparatus having nonlinear elements 98 and 99 of this example. The MIM substrate 90 includes each one of the nonlinear elements 98 and 99. FIG. 9B is a sectional view taken along line 9B—9B of FIG. 9A. The transparent display apparatus of Example 5 has the same structure as the display apparatus 10 shown in FIG. 1, except that the former has the MIM substrate 90 shown in FIGS. 9A and 9B instead of the MIM substrate 25 shown in FIG. 1.

Referring to FIGS. 9A and 9B, an electrode 92 is formed as an island on a substrate 91 made of glass, and a nonlinear resistance layer 93 composed of an anodic sulfidization film is formed over the electrode 92. An island-shaped insulating film 94 is formed covering the electrode 92 and the nonlinear resistance layer 93. On the insulating film 94 are formed a scanning electrode 95 branching from a scanning line 102 and an upper electrode 96, both of which are electrically connected with the nonlinear resistance layer 93 via contact holes 100 and 101, respectively.

A pixel electrode 97 composed of a transparent conductive film is formed on the substrate 91. A portion of the pixel electrode 97 covers the upper electrode 96, so as to be electrically connected with the nonlinear resistance layer 93 via the upper electrode 96. The scanning electrode 95, the nonlinear resistance layer 93, and the electrode 92 constitute the nonlinear element 98. The upper electrode 96, the nonlinear resistance layer 93, and the electrode 92 constitute the nonlinear element 99. The nonlinear elements 98 and 99 are electrically connected with each other via the electrode 92 in reverse polarities.

Now, the process of fabricating the MIM substrate 90 of the display apparatus of this example will be described.

A conductive thin film doped with impurities is formed on the substrate 91 made of an insulator such as glass. The conductive thin film is then patterned into a predetermined shape to form stripe-shaped electrodes (not shown). More specifically, a zinc film having a thickness of about 300 nm doped with 100 ppm of nickel is formed on the substrate 91 made of a glass plate (Corning 7059 borosilicate glass) by sputtering. The zinc film is then subjected to photolithography and etching, so as to obtain the stripe-shaped electrodes.

Thereafter, an anodic sulfidization film (not shown) is formed by anodically sulfidizing each surface of the electrodes by use of an electrolysis apparatus as shown in FIG. 3. In this example, the substrate 91 is immersed in an ethylene glycol solution containing about 0.1 mol/l of sodium sulfide and the like. The substrate 41 is used as the anode and a voltage is applied between the anode and a cathode made of platinum so as to form a layer of zinc sulfide on each zinc surface exposed on the substrate 91. The constant-current formation method was used for applying a voltage between the anode and the cathode. The anodic sulfidization film made of zinc sulfide having a thickness of about 70 nm was formed by applying a voltage at a constant current density of about 1 A/m$^2$ for an appropriate formation time.

The stripe-shaped electrodes with the anodic sulfidization films formed thereon are then patterned into islands of electrodes. The island-shaped electrodes 92 and the nonlinear resistance layers 93 composed of the anodic sulfidization films formed thereon are thus obtained by photolithography and etching.

Thereafter, the insulating film 94 having an island shape is formed covering each of the electrodes 92 and the nonlinear resistance layers 93, and the contact holes 100 and 101 for connecting the nonlinear resistance layer 93 with the scanning electrode 95 and the upper electrode 96 to be described later in detail, respectively, are formed through the insulating film 94 for each pixel. More specifically, a photosensitive resin having a thickness of about 300 nm is applied to the surface of the substrate 91 by the spin coat method. After the exposure and development process, the insulating film 94 with the contact holes 100 and 101 formed therethrough is obtained.

Then, the scanning lines 102, the scanning electrodes 95 branching from the scanning lines 102, and the upper electrodes 96 for connecting the nonlinear resistance layers 93 with the pixel electrodes 97 are formed. More specifically, a titanium film having a thickness of about 200 nm was formed by sputtering. After the photolithographic process, the film was wet-etched by use of an ethylene diamine tetraacetic acid solution, and a photoresist was removed. Thus, the scanning lines 102, the scanning electrodes 95, and the upper electrodes 96 were formed. By this formation, the scanning electrodes 95 and the upper electrodes 96 are electrically connected with the nonlinear resistance layers 93 via the contact holes 100 and 101, respectively.

Finally, the pixel electrodes 97 each composed of a transparent conductive film is formed. In this example, ITO is deposited to a thickness of about 200 nm by sputtering. After the photolithographic process, the resultant film is wet-etched by use of hydrobromic acid. Then, a photoresist is removed so as to obtain the pixel electrode 97 connected with the upper portions of the nonlinear resistance layers 93 via the corresponding upper electrodes 96.

Thus, there is fabricated the MIM substrate 90 having, for each pixel, the nonlinear element 98 composed of the electrode 92, the nonlinear resistance layer 93, and the scanning electrode 95 and the nonlinear element 99 composed of the electrode 92, the nonlinear resistance layer 93, and the upper electrode 96 which are connected with each other in series in reverse polarities (in a back-to-back structure).

The fabrication of a counter substrate having data electrodes and the injection of a display medium into a space between the substrates are conducted in the manner as described in Example 1.

According to the display apparatus of Example 5, the two nonlinear elements 98 and 99 are connected with each other in the back-to-back structure between the scanning electrode 95 and the pixel electrode 97. This improves the asymmetrical current-voltage characteristic of the element. Also, the upper electrode 96 made of a material different from that of the pixel electrode 97 is formed between the nonlinear resistance layer 93 and the pixel electrode 97. This makes it possible to select the material for the pixel electrode 97 at discretion, which is advantageous in the case of the transparent display apparatus. Further, since the upper electrode 96 is formed of the same material as the scanning electrode 95, the asymmetricity of the nonlinear elements can be improved.

In Example 6, two two-terminal nonlinear elements were connected with each other in the back-to-back structure. It is also possible to connect two nonlinear elements in parallel in reverse polarities, i.e., in a ring structure.

(EXAMPLE 6)

In Example 6, a reflective liquid crystal display apparatus with the same structure as that described in Example 4 except that an anodic sulfidization film of zinc doped with plural kinds of impurities is used as the nonlinear resistance layer.

First, a zinc target with iron chips and chromium chips placed thereon is used for sputtering, so as to form a zinc film doped with about 0.3% of iron and 0.1% of chromium on a glass substrate to a thickness of about 300 nm. A MIM substrate is then fabricated by following the same procedure as that described in Example 4 including the patterning of the scanning electrodes, the anodic sulfidization, the formation of the insulating film, and the formation of the pixel electrodes.

Figure 10:
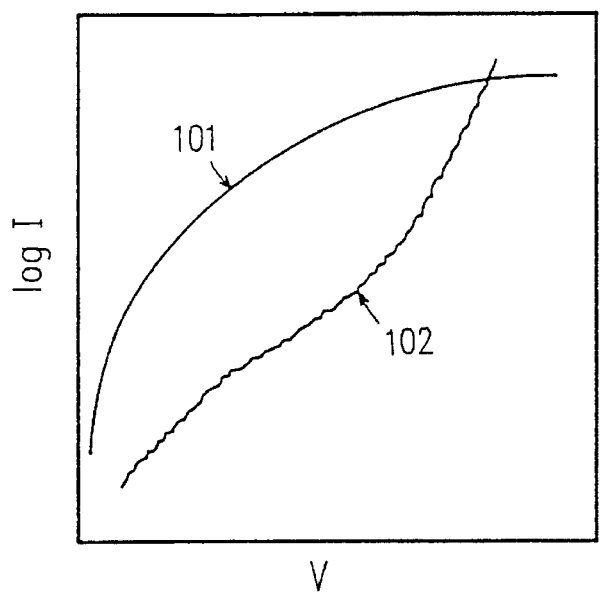
FIG. 10 is a graph showing the I–V characteristic of a nonlinear element used for a sixth example of the display apparatus according to the present invention.

In FIG. 10, a curve 101 shows the I–V characteristic of the nonlinear element obtained in Example 6. A curve 102 represents the I–V characteristic of a nonlinear element obtained by forming a zinc film doped with about 300 ppm of iron, about 100 ppm of chromium, and about 100 ppm of copper. As is observed from FIG. 10, the I–V characteristic of a nonlinear element can be varied depending on the kind and the amount of impurities doped in the conductive film.

The fabrication of a counter substrate and the subsequent processes to complete the display apparatus are conducted in the manner as described in Example 1.

(EXAMPLE 7)

In Example 7, a transparent display apparatus having nonlinear elements where anodic sulfidization films of zinc doped with chromium as impurities are used as the nonlinear resistance layers.

Figure 11A:
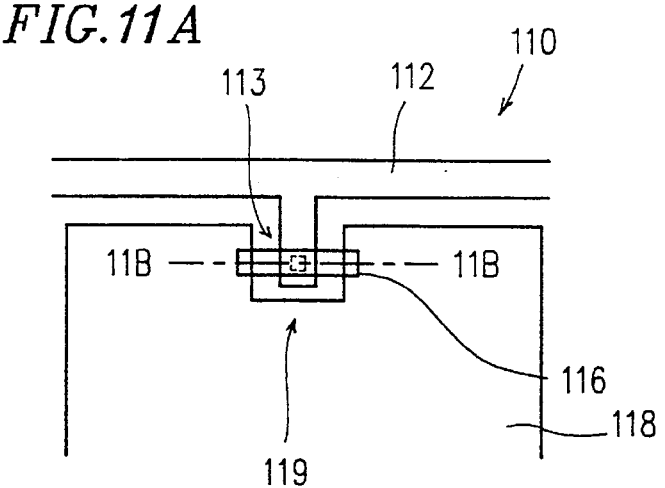
FIG. 11A is a plan view of one pixel portion of a seventh example of the display apparatus according to the present invention.
Figure 11B:
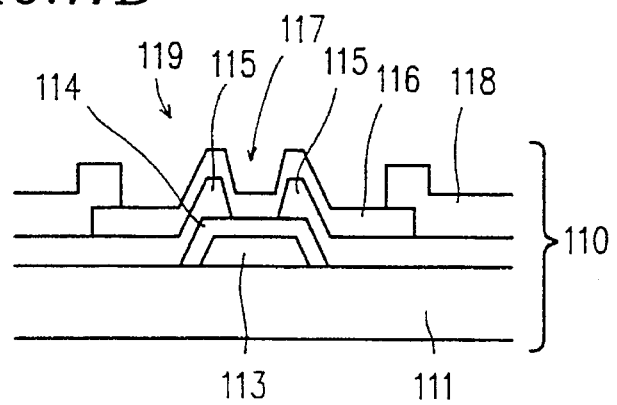
FIG. 11B is a sectional view taken along line 11B—11B of FIG. 11A.
Figure 12A:
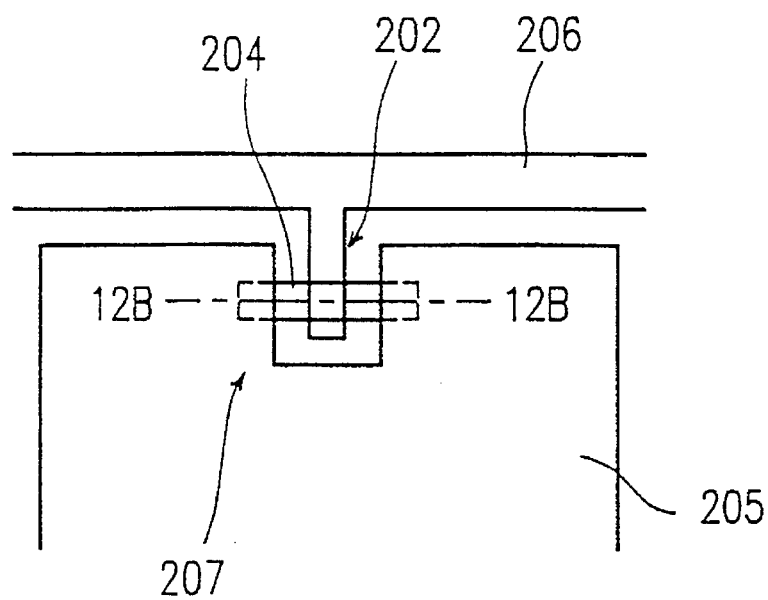
FIG. 12A is a plan view of one pixel portion of a conventional display apparatus using a nonlinear element including a tantalum oxide film.
Figure 12B:
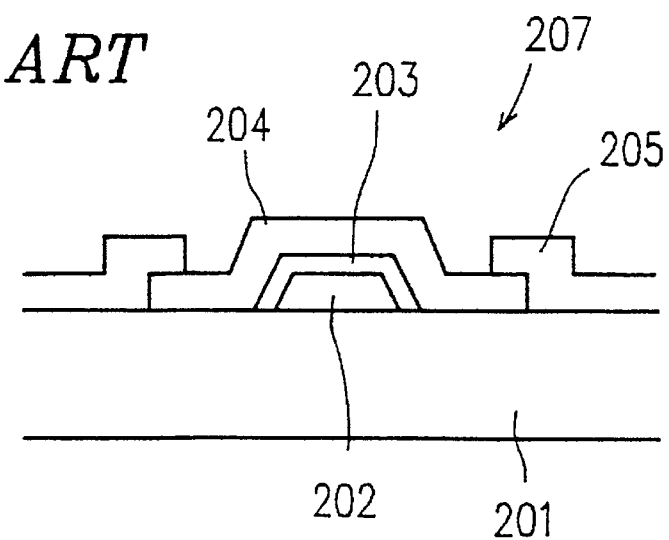
FIG. 12B is a sectional view taken along line 12B—12B of FIG. 12A.

FIG. 11A is a plan view showing one pixel portion of a MIM substrate 110, and FIG. 11B is a sectional view taken along line 11B—11B of FIG. 11A. The transparent display apparatus of Example 7 has the same structure as the display apparatus 10 shown in FIG. 1, except that the former has the MIM substrate 110 shown in FIGS. 11A and 11B instead of the MIM substrate 25 shown in FIG. 1.

Referring to FIGS. 11A and 11B, a scanning line 112 and a scanning electrode 113 branching from the scanning line 112 are formed on a substrate 111 made of an insulator such as glass. A nonlinear resistance layer 114 composed of an anodic sulfidization film is formed on the scanning electrode 113. The scanning line 112 and the scanning electrode 113 are made of a zinc film doped with chromium as impurities, and the nonlinear resistance layer 114 is obtained by anodically sulfidizing the scanning electrode 113. An insulating film 115 is formed covering the nonlinear resistance layer 114, and an upper electrode 116 is formed on the insulating film 115. A contact hole 117 is formed through the insulating film 115, so that the upper electrode 116 is electrically connected with the nonlinear resistance layer 114 via the contact hole 117. An pixel electrode 118 is also formed on the insulating film 115. Portions of the pixel electrode 118 overlap the upper electrode 116 so as to electrically connect with each other. The scanning electrode (lower electrode) 113, the nonlinear resistance layer 114, and the upper electrode 116 constitute the nonlinear element 119.

Now, the process of fabricating the MIM substrate 110 of the display apparatus of this example will be described.

First, a zinc target with chromium chips placed thereon is used for sputtering, so as to form a zinc film doped with 300 ppm of chromium on a substrate 111 made of glass to a thickness of about 300 nm. Then, a conductive film formed on the substrate 111 is patterned to obtain the scanning lines 112 and the scanning electrodes 113 in the manner as described in Example 1. The nonlinear resistance layers 114 are then formed on the scanning electrodes 113 by the anodic sulfidization.

Thereafter, an organic photosensitive resin is applied to the substrate 111 with the above structure to a thickness of about 400 nm by the spin coat method. After the photolithographic process, the insulating film 115 with the contact hole 117 formed therethrough is obtained.

Then, aluminum is deposited to a thickness of about 300 nm by sputtering, and wet-etched by use of phosphoric acid or a mixed acid of phosphoric acid, nitric acid, and acetic acid. Then, a photoresist is removed to obtain the upper electrodes 116 connected with the upper portions of the nonlinear resistance layers 114 via the contact holes 117.

ITO is deposited to a thickness of about 200 nm by sputtering, and then patterned so as to partly contact with the upper electrodes 116. Thus, the pixel electrodes 118 connected with the upper portions of the nonlinear resistance layers 114 via the corresponding upper electrodes 116 are formed.

Thus, there is formed the nonlinear element 119 composed of the sulfide film obtained by the anodic sulfidization of zinc doped with chromium as impurities as the nonlinear resistance layer 114, the scanning electrode 113, and the upper electrode 116.

The fabrication of a counter substrate and the subsequent processes to complete the display apparatus are conducted in the manner as described in Example 1.

Thus, in Example 7, since an anodic sulfidization film capable of exhibiting a high ON/OFF ratio is used in each nonlinear element, the resultant display apparatus can provide high resolution and high contrast. Also, since the upper electrodes 116 made of a material different from that for the pixel electrodes 118 are formed between the nonlinear resistance layers 114 and the pixel electrodes 118, the material for the pixel electrode can be selected from a variety of kinds of material. This is advantageous, in particular, in the case of a transparent display apparatus where a transparent conductive film (ITO) is often used for the pixel electrodes 118. Further, chromium can be doped in the nonlinear resistance layers, and the electrical characteristic of the nonlinear resistance layers can be adjusted by varying the amount of chromium doped therein. This makes it possible to vary the I–V characteristic of the nonlinear elements.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A display apparatus comprising:

a display medium having an electro-optic characteristic;

a pair of substrates arranged to face each other sandwiching the display medium;

a pair of electrodes disposed in inner surfaces of the pair of substrates for applying a voltage to the display medium; and at least one nonlinear element including a nonlinear resistance layer composed of a sulfide film obtained by immersing a conductive or semiconductive film in a solution containing sulfur ions or ions having sulfur atoms and applying a voltage between the conductive or semiconductive film as an anode and a cathode, the nonlinear element being disposed on the inner surface of one of the pair of substrates and electrically connected to one of the pair of electrodes;

wherein the film is a first substance selected from a group consisting of zinc, tantalum, and cadmium and the nonlinear resistance layer is a sulfide of the first substance; and wherein the film includes at least one second substance selected from a group consisting of aluminum, iron, nickel, chromium, copper, silver, manganese, and indium, and the nonlinear resistance layer includes the second substance as impurities.

2. A display apparatus according to claim 1, wherein the display medium is liquid crystal.

* * * * *